(12) United States Patent  
Jorapur (10) Patent No.: US 7,299,382 B2
(45) Date of Patent: Nov. 20, 2007

(54) SYSTEM AND METHOD FOR AUTOMATIC TEST CASE GENERATION

(75) Inventor: Gopal P. Jorapur, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 926 days.

(21) Appl. No.: 10/134,816

(22) Filed: Apr. 29, 2002

(65) Prior Publication Data

US 2003/0204784 A1   Oct. 30, 2003

(51) Int. Cl.
*G06F 11/00*   (2006.01)

(52) U.S. Cl. ............................ 714/38; 717/124; 703/22

(58) Field of Classification Search ................. 714/38; 717/124; 703/22
See application file for complete search history.

(56) References Cited

U.S. PATENT DOCUMENTS

| | | | |
|---|---|---|---|
| 5,021,997 A * | 6/1991 | Archie et al. .................. 714/31 |
| 5,751,941 A * | 5/1998 | Hinds et al. .................. 714/38 |
| 5,909,544 A * | 6/1999 | Anderson et al. ........... 709/208 |
| 6,002,869 A | 12/1999 | Hinckley |
| 6,023,773 A * | 2/2000 | O'Donnell et al. ........... 714/40 |
| 6,249,882 B1 | 6/2001 | Testardi |
| 6,279,124 B1 * | 8/2001 | Brouwer et al. ............... 714/38 |
| 6,301,701 B1 | 10/2001 | Walker |
| 6,378,088 B1 * | 4/2002 | Mongan ....................... 714/39 |
| 6,446,120 B1 * | 9/2002 | Dantressangle ............. 709/224 |
| 6,584,569 B2 * | 6/2003 | Reshef et al. ................ 713/201 |
| 6,601,018 B1 * | 7/2003 | Logan ......................... 702/186 |
| 6,662,312 B1 | 12/2003 | Keller et al. |
| 2003/0093717 A1 * | 5/2003 | Mason ......................... 714/38 |
| 2003/0131285 A1 * | 7/2003 | Beardsley et al. ............ 714/38 |
| 2004/0015861 A1 * | 1/2004 | Nagalkar ..................... 717/124 |
| 2004/0015865 A1 * | 1/2004 | Cirone et al. ................ 717/124 |
| 2004/0205406 A1 * | 10/2004 | Kaliappan et al. ............ 714/31 |

OTHER PUBLICATIONS

Chillarege, "Software Testing Best Practices", IBM Research—Technical Report RC 21457 Log 96856, Internet, Apr. 26, 1999, http://www.chillarege.com/authwork/TestingBestPractice.pdf.

Kropp, et al, "Automated Robustness Testing of Off-the-Shelf Software Components", *Fault Tolerant Computering Symposium*, Munich, Germany, Jun. 23-25, 1998.

(Continued)

*Primary Examiner*—Yolanda L Wilson
(74) *Attorney, Agent, or Firm*—Robert C. Kowert; Meyertons, Hood, Kivlin, Kowert & Goetzel, P.C.

(57) ABSTRACT

A system and method provide testing of software in different configurations automatically. Templates may be provided for developers to create an application or for generating tests. One or more tests may be generated for testing the application. The testing scope may range between a plurality of configurations for the application in one or more environments. Tests may include test blocks corresponding to parts of the application for testing according to the execution order of the parts of the application. Tests may change input values, modules in the application, configuration settings, data types, communication parameters, and/or other application elements for testing. Such changes may be generated automatically during testing. Test code may be inserted in the application for testing. Application generation and compilation may be automated during testing. Deployment and undeployment of applications may also be automated for testing.

66 Claims, 4 Drawing Sheets

OTHER PUBLICATIONS

Chu, et al, "An Integrated Test Environment for Distributed Applications", Centre for Software Reliability, Department of Computing Science, University of Newcastle upon Tyne, UK, Jan. 1997.

von Mayrhauser, et al, "The *Sleuth* Approach to Aerospace Software Testing", Department of Computer Science, Colorado State University, Fort Collins, Colorado, 1995.

\* cited by examiner

FIG. 6

SYSTEM AND METHOD FOR AUTOMATIC TEST CASE GENERATION

BACKGROUND OF THE INVENTION

1. Field of the Invention

The present invention relates to software testing, and more particularly to generating test cases automatically.

2. Description of Related Art

Software development can be a difficult process requiring the investment of significant time and resources. Software tools may be used to assist software development, for example by providing abstractions to represent underlying code or details, or by automating tasks. During the development of a new application and after development completion, the application may be tested to ensure that it functions as desired. However, as development tools enable more complex applications to be built, with interoperating modules, more elaborate and complex testing may be required to verify the operation of the software developed. Lack of adequate testing may lead to loss of reliability or loss of functionality, up to complete inoperability on the part of the application, resulting in wasted time and resources. As with development of applications in any environment or language in general, these issues are relevant to developing and testing Java 2 Enterprise Edition (J2EE) software.

Figure 1:
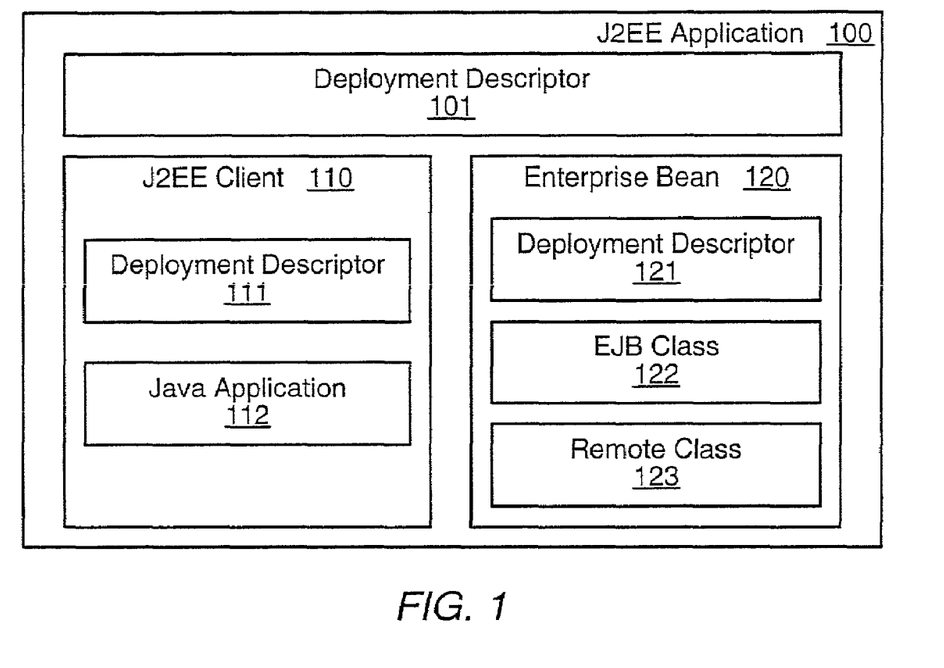
FIG. 1 illustrates one embodiment of a J2EE application including various modules.

As illustrated in FIG. 1, J2EE applications are based on components, or modules. Modules may be of different types, including Enterprise Java Beans (EJBs), Resource Archives (RARs), and Web Archives (WARs). Each module of an application may be responsible for some resource, functionality, or other element that is a part of the operation of that application. An Enterprise Application Archive (EAR) may constitute a standalone application containing J2EE modules. The modules and the EAR file may be platform-independent Java Archives (JAR). Different modules may be packaged within an EAR file. For example, as shown in FIG. 1, a J2EE application 100 stored as an EAR file may include two modules 110 and 120 stored as JAR files. Each module may include its own elements, as indicated at 111, 112, 121, 122, and 123. An EAR file may be deployed on a J2EE server, executed on the server, and undeployed when it has completed its operation. The server may provide a container for an application or module to operate, which may specify a runtime environment with particular features or settings for security, concurrency, life cycle management, transaction, deployment, naming, and/or other services.

A J2EE module or application may have an associated deployment descriptor, typically expressed in eXtensible Markup Language (XML). For example, J2EE application 100, J2EE client 110, and Enterprise Bean 120 include corresponding deployment descriptors 101, 111, and 121. A deployment descriptor may describe configuration requirements of the deployment of its associated module, such as security mechanisms, transaction attributes, or resource references. For example, an EJB deployment descriptor may identify the EJB interface and class names. The container or server of an application may use the deployment descriptor to configure services or generally parts of the runtime environment for the corresponding module. For example, an EAR file 100 may include a deployment descriptor 101 specifying security attributes applicable to the application and a module 120 within the EAR file may include a deployment descriptor 121 describing the scope of its transactions when invoked by other components 110.

Given the modular characteristics of J2EE, which may also be a feature of other operating or programming environments, testing may involve tests of individual member components as well as entire applications. When checking modules, testing may verify that they accomplish their desired purpose or meet their specifications (e.g., produce correct results) and that they operate properly (e.g., do not crash). Testing done on any one platform or server may be sufficient to reveal failures of modules to meet their specifications. However, testing proper operation can be more difficult as this may be dependent on configuration parameters, such as stored in deployment descriptors, and the interaction with other modules, containers, or servers. Testing an application as a whole, including the relationship between modules, their interoperation, or the interaction with a container or server, may also be difficult for similar and additional reasons. Other issues may add to the testing complexity at the application level; for example, results may depend on the execution order of the modules or passing of messages between modules. As a result, the test coverage desired may be extensive and it may be too difficult for application developers to cover the many potential scenarios.

SUMMARY

A system and method for automatic testing may be provided for software developers to automatically generate and perform tests on software. In one embodiment, a system and method for automatic testing may be provided to automatically generate and execute Java 2 Enterprise Edition (J2EE) software tests. Testing may be done at least in part automatically and testing may involve one or more tests to ensure proper operation of the software tested.

One or more of the tests used during testing may be generated automatically, either before testing or dynamically during testing. The tests may be from templates. Templates may be stored in a library. One or more tests may be specified for use during testing, for example by a user, by a program, or by default. One or more other tests scenarios may be generated from the original tests, for example by introducing variations in an original test, such as by varying the configuration of the operating environment, input values used, configuration settings, data types used, communication settings, or other elements or combination of elements of the test. Such variations to create scenarios may be introduced to increase the test scope and/or may be generated automatically from original tests or model tests. A test generator may receive as input configuration settings and/or tests for an application and generate test scenarios based on the configuration settings or tests. The software may then be tested according to the tests in the various scenarios.

In one embodiment, one or more configuration parameters may be changed during testing. For example, data types may be ported or converted, transaction and security attributes may be changed, interfaces may be changed between local and remote, various values may be given to variables, and/or enhanced features may be implemented and access given to the application for testing. Other parameters may be changed to test the operation of an application and ensure that it operates adequately within its environment. Some environments may specify operating standards for application, for example regarding exception handling, message passing, memory access, or other computational element and tests may be implemented to verify that an application meets one or more of these operating standards. Different tools may be used or implemented to catch different application errors or catch errors in different ways. For example, two different settings or embodiments may provide testers different amount of information regarding errors detected. Errors may also be reported differently, such as by storing test data, by displaying test data on a monitor, or in some other way or combination of ways. Developers may include code that checks execution conditions within their programs. In one embodiment, testing may determine whether a condition checked by developer code fails and may report information regarding the failure.

Executing a test may involve executing the application within a test framework according to one or more test configurations and detecting errors occurring during the application execution. The framework may provide an execution environment for the application to be tested. For example, it may provide services to the software, simulate or provide resources, and/or may provide stability so that errors in the software have a limited impact on other software then executing or ensure that the tests/software terminate gracefully. In one embodiment, testing may involve executing a modified version of the application to be tested. For example, test code may be inserted within the application and/or some of its modules to provide additional test data, such as the status of some computation during testing. Testing may span different application executions, with variations in the test settings such as executing the application with different configurations, input values, or other parameters that may result in different execution of the application to be tested.

In one embodiment, a test for an application and a plurality of different configurations for executing the test may be generated. For each of the plurality of configurations, the test may be deployed, executed, and undeployed according to that configuration. A report indicating the results of the tests may be generated. The results may reflect some behavior of the application during execution. Results may also reflect operations during deployment and undeployment of the application to be tested. In one embodiment, parts of the application or its modules may be generated automatically. In one embodiment, at least part of the test generated is included within the application or its modules, so that testing involves executing the application. The plurality of configurations may vary from each other in their security, transaction, input, or other settings.

In one embodiment, a test including a plurality of test blocks may be generated for an application including a plurality of modules. For each of the plurality of modules there may be at least one corresponding test block. A configuration for executing the test may be generated. The test may be executed a plurality of times according to the configuration. The test may be deployed and undeployed once or up to a plurality of times. During testing, the test blocks may be executed in different orders in different test executions. A report may be generated indicating the results of the testing. The results of each test execution may be provided separately.

While the invention is described herein by way of example for several embodiments and illustrative drawings, those skilled in the art will recognize that the invention is not limited to the embodiments or drawings described. It should be understood that the drawings and detailed description are not intended to limit the invention to the particular form disclosed but, on the contrary, the intention is to cover all modifications, equivalents, and alternatives falling within the spirit and scope of the present invention as defined by the appended claims. The headings used are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS OF THE INVENTION

A system and method is provided to at least partially automate testing of computer applications using an automatic test generator. Testing may check that an application complies with one or more specification, for example that an application may operate within the specifications of one or more operating environments. The test generator may automatically generate one or more tests to cover at least in part some area of a specification. In one embodiment, automatic test cases may be generated for Java 2 Enterprise Edition (J2EE) software. Test cases for J2EE may cover the Enterprise Java Bean (EJB) specification. While various embodiments may be described with reference to the J2EE environment and J2EE applications, other embodiments may be used in other environments or for other applications.

Software may be tested at least in part automatically and testing may use automatically generated test cases. Test cases may be generated from one or more original tests by varying the test parameters or configuration settings to provide different testing scenarios. Different configurations for the software to be tested may be generated and used during testing to determine the results of operating the software in these configurations. In one embodiment, test cases may be automatically generated so that a plurality of different values may be used for each variable of the software or for its expected input values during testing to increase the test scope. Other variations may be introduced to provide different testing scenarios and increase the scope of the tests.

Each test may be generated in one or more blocks corresponding to one or more parts of the application to be tested. For example, a test block may correspond to a module of the application to test some corresponding functionality of the application. Test blocks may be executed in different orders. For example, in two executions different parts of an application may execute in different orders. The test blocks may be executed or used during testing in different orders, for example following the order of their corresponding parts of the application. In one embodiment, some test blocks may be inserted within the application, including inside corresponding one or more of its modules, and testing may involve executing this modified application. Different tests may have test blocks inserted differently into the application to be tested. Different tests may execute the application differently, so that its modules execute in a different order.

Automated tests may cover the life cycle of an application not simply during execution but from deployment to undeployment to catch more potential errors. A broader test may involve automated testing during code generation and/or compilation of the application. Testing may involve inserting test code into the software to be tested to provide a different perspective on the application test. Testing may involve generating from an application to be tested a plurality of different applications of parts of applications incorporating variations that may reveal different problems during testing. For example, a plurality of modules may be generated from a module of an application to be tested, each incorporating one or more variations from the original module. The variations may include variations in the configuration file of the module. The application may then be tested with one or more of the generated modules. In one embodiment, one or more applications may be generated each incorporating a different module and each application may be tested separately, including on different machines to provide faster testing.

Automating the production of an application or applications, such as generation or compilation, may also limit human error and enable more testing to be performed. For example, automated testing may first prepare the application and then test it in one or more configurations. A modified version of the application may then be generated and tested in the same or different set of configurations. More versions and configurations can be automatically produced and tested in a similar manner. By automating the generation of an application, automating testing may provide more testing and limit human error. In one embodiment, other application versions or configurations that are not automatically generated, but may be created by a user, may be tested automatically.

Figure 2:
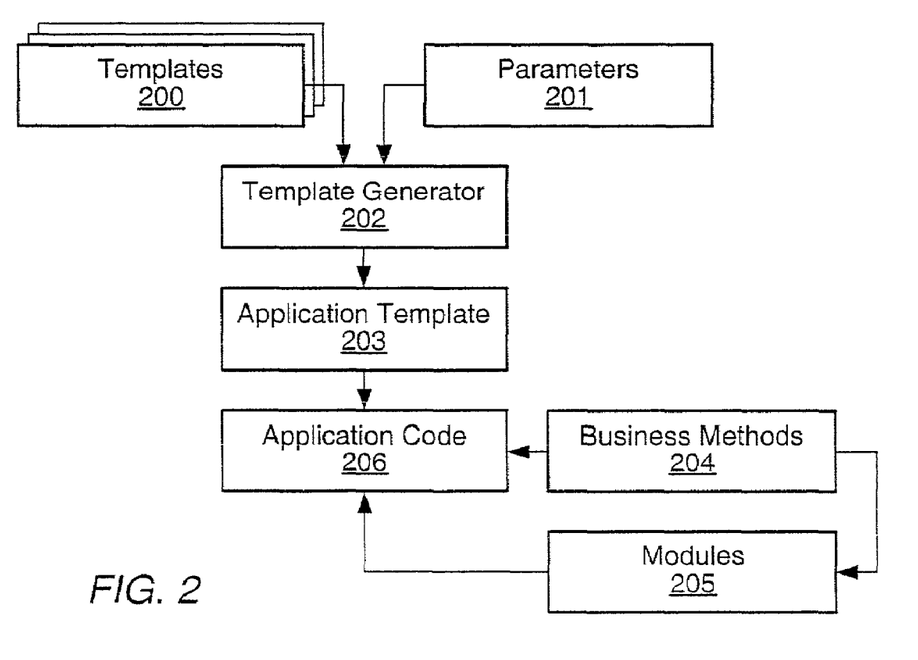
FIG. 2 illustrates generating an application template according to one embodiment.

In one embodiment as illustrated in FIG. 2, one or more standard templates 200 may be provided and an application template may be generated by a generator 202 from one or more of the standard templates 200 in accordance with a set of parameters 201. The standard templates 200 may be provided to save resources, avoid errors, foster uniform standards, and/or provide standard functions for developers. A template 203 may be generated automatically without explicit standard templates by a template generator 202 from parameters 201 provided by a user, an application, or default settings. Through parameters 201, a user may indicate a standard template or may include more complex data indicating, for example, modules and/or functions to be included, communication protocols to be used, resources available, operating environment, etc.

The template generator 202 may be a script that is configured to generate the application template automatically. A script may include one or more commands recognizable by an operating system or other program. Each application template 203, as well as standard templates 200, may differ from each other based on several factors. Some templates 200 or 203 may be EJB code templates. An EJB may be a component of object-oriented, distributed, enterprise-level J2EE applications, as shown in FIG. 1. Some EJB templates may include code for catching exceptions, passing values, and/or for standard functions. Standard functions may include libraries enabling input/output control for indicating status during operation, for example screen display routines enabling messages to be displayed. Other templates may include similar functionality. Different templates may be tailored for Session Beans (either Stateless or Stateful), for Entity Beans (either with Bean Managed Persistence or Container Managed Persistence), or for Message Driven Beans. Similarly, templates may be provided for client application code, such as for Web Clients (e.g., Servlets) or Application Clients (e.g., java clients), to interact with the applications or modules to be tested. Some templates may be used for a plurality of different types of software while others may be tailored for a specific type of software. For example, a template may be provided for an EJB configured to provide generic database access for a variety of other modules and another template may be provided for an EJB configured to process results from a particular web page.

A session bean may be a module created by a client and existing for the duration of a single client-server session to perform operations for the client. An entity bean may represent persistent data. A message-driven bean may be an asynchronous message consumer with no state for a specific client, but may be accessible by a client sending messages to a destination associated with the message-driven bean.

An application may be developed from an application template, as illustrated in FIG. 2, by adding modules 205 and business methods 204 to the template. In one embodiment, modules may be generated from scripts following a similar procedure as described above for the application template or may be produced by the template generator 202 as part of the application template 203. Business methods may implement the logic, operations, or rules of an application. They may be added to modules or the application to provide work performing functionality. For example, a developer may add code to classes created as part of the template, remove original template code, or modify original template code to provide the desired software properties. In one embodiment, developers may produce code for modules or applications without using templates. Developers may update templates 200 or create new templates 200, for example from the code of developed modules or applications. In one embodiment, generating an application may be automated.

Figure 3:
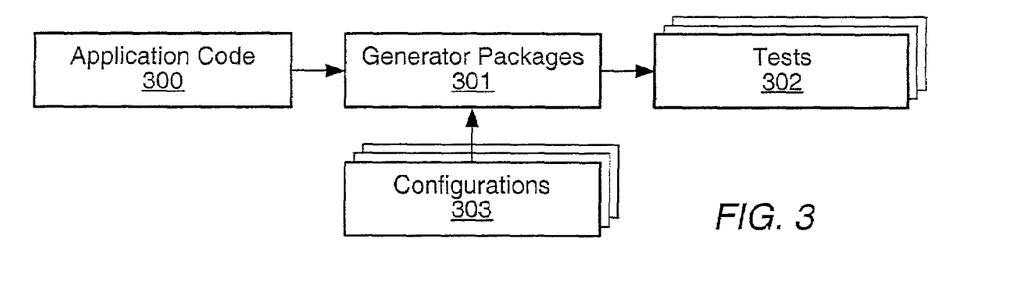
FIG. 3 illustrates one embodiment for generating tests.

FIG. 3 illustrates the production of tests corresponding to an application 300 in one embodiment. A software application 300 may be processed by a test generator/packager 301. The test generator may be a script, an application, or other element configured to generate tests for software. The test generator 301 may return one or more tests 302 corresponding to the application 300. In one embodiment, the test generator 301 produces tests 302 corresponding to modules that are part of the application 300. For example, the test generator 301 may access one or more modules of the application 300 and generate tests 302 including test code configured to interact with at least one of the modules.

The tests 302 generated may include test code that may be inserted within the code of the application 300 or its modules. Once inserted, the test code may provide reports on processes that are not normally visible to users during execution or may verify that the module is operating properly by asserting desired properties exist or are produced during execution. For example, the test code may print out the value of a variable at certain times during execution or the test code may report whether a variable has a certain value. The tests 302 may be inserted automatically within the application 300 to be tested to produce one or more derivative applications configured to perform as test applications. Test applications may provide testing functionality not otherwise included in the original application 300; for example they may produce more detailed error messages.

The tests 302 generated may be one or more replacement modules for the application 300 that are configured to test or verify the proper operation of the application 200 and/or its modules. For example, the application 300 may be a J2EE application including an EJB and a WAR as its modules. The test generator 301 may produce test modules that include testing code as its output 302 based on the modules. For example, the test generator 301 may access an EJB module of the application 300 and produce one or more derivative EJB modules with different testing code inserted. The test generator 301 may produce as tests 302 one or more applications based on the original application 300 but with different test code inserted in each of the test applications produced as tests 302. In one embodiment, the test generator 301 may be configured to receive as input individual modules and return one or more tests corresponding to each module.

The generator 301 may produce one or more client applications corresponding to an application 300 in one embodiment. As a client generator, generator 301 may receive as input the software application 300. The generator 301 may in return generate one or more clients for the application 300. In one embodiment, the generator 301 produces one or more clients that interact with functions of the modules of the application 300.

The generator 301 may produce one or more different configurations, such as deployment descriptors, corresponding to an application and its modules in one embodiment. The deployment descriptors may be configured for testing the application 300. In one embodiment, the generator 301 may be configured to access a library of deployment descriptors to generate deployment descriptors that will configure run time environments to execute tests 301. Variations in a plurality of deployment descriptors for each test 301 may constitute different testing scenarios based on these tests. In one embodiment, such configuration scenarios may be generated dynamically while tests are executing.

In one embodiment, a single generator/packager may be configured to combine the functionality of a test generator, client generator, and/or deployment descriptor generator into one or more test files 301. The generator/packager may also compile code for execution. In one embodiment, the test files produced may be EAR files. The generator/packager may receive an application 300 and produce one or more tests 301, client applications, and deployment descriptors and package them. The generator/packager may be configured to package the tests, clients, and deployment descriptors as intermediate results into tests 301 that may be ready to be executed for testing. In one embodiment, the generator/packager may be tailored for individual elements, so that for example it may receive as input EJB code and output a JAR file containing the Bean, including a deployment descriptor, ready for testing.

The generator/packager 301 may be configured to access one or more libraries that includes template test codes, template clients codes, and/or template deployment descriptors for use when generating the tests 302 for the application 300. For example, the application 300 may have been created or generated from a template in library. This template may have corresponding client templates, deployment descriptor templates, test templates, or other templates. Clients, deployment descriptors, tests, or other modules may be generated from templates corresponding to the template related to the application to be tested. Generators or libraries may keep track of corresponding templates. Generators may detect from which templates an application may be derived, for example by accessing information in the application source code or matching application code with code in one or more library.

In one embodiment, the test generator 301 may receive as input one or more configuration files 303 in addition or instead of an application and may generate tests based on the configuration 303. For example, the tests may involve varying the configuration parameters within one or more configuration files. In some cases, configuration changes may be expected to produce errors. These may be referred to as negative tests. During negative tests, testing may be undertaken to ensure that the exceptions, errors, or other proper handling of the situation occurs. Such configuration variations may be generated dynamically, for example to facilitate the automation of a plurality of tests or enable simpler code changes.

Figure 4:
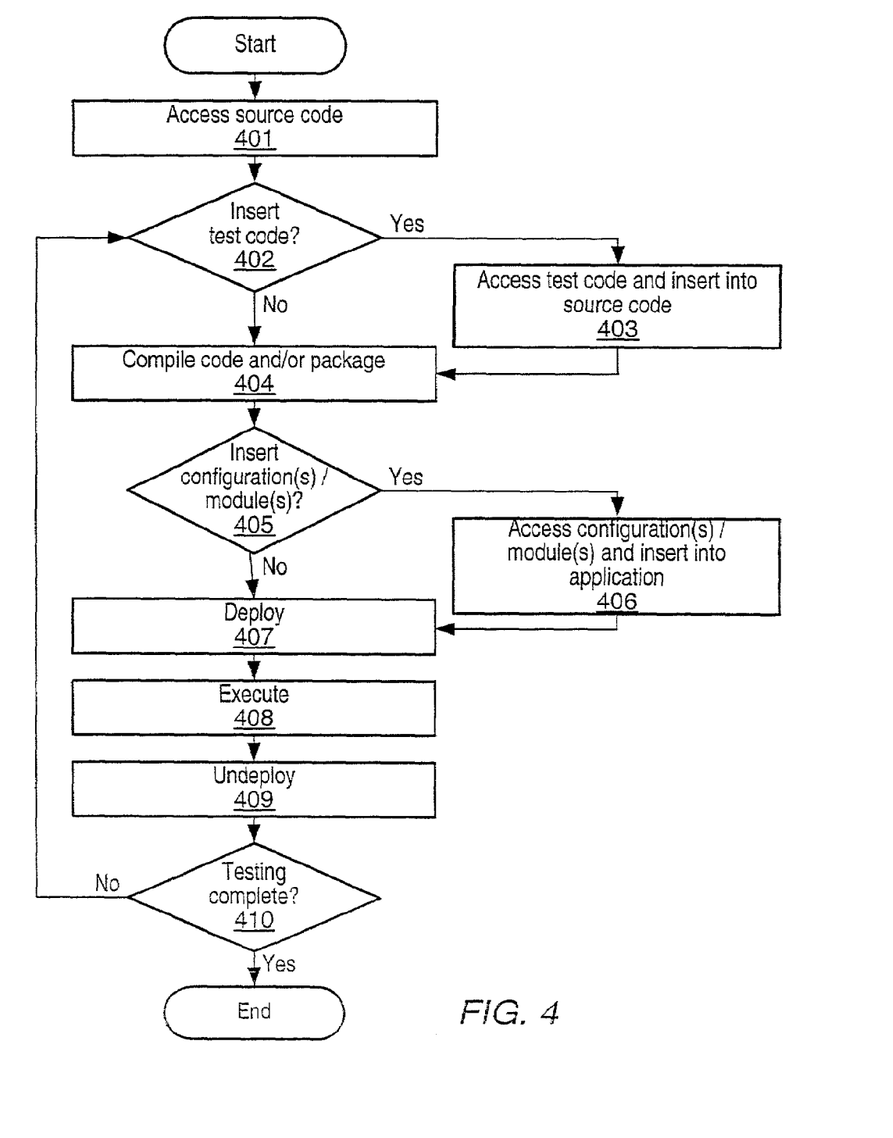
FIG. 4 illustrates testing an application during application preparation and execution according to one embodiment.

FIG. 4 illustrates testing an application according to one embodiment of an automated test. The automatic test generator may provide test code, test applications, and/or test modules including configurations to test an application, either dynamically during testing or before testing. Automated testing may be performed by a dedicated application configured to use the test parameters generated by the automated test generator. In one embodiment, automated testing is performed as part of the automated test generator. Testing may begin by accessing source code 401 and complete after undeployment 410 as illustrated in FIG. 4. In one embodiment, testing may include using the test generator to produce one or more tests, test code, modules, etc. In one embodiment, testing may include less than the whole process illustrated in FIG. 4. For example, testing may stop before undeployment 409 or may start with deployment 407. Testing may involve multiple iterations using a plurality of different testing conditions, as indicated at 410. During testing, a log or other data may be collected or maintained regarding testing results.

The source code accessed 401 may describe the application to be tested. Some of the source code may have been automatically generated. Parts of the source code may be derived from templates. Depending on the type of testing to be performed or the type of results sought, testing may determine whether to add test code to the source code 402. Test code may be inserted into the source code 403, for example into code for one or more modules, to provide additional functionality for testing. A test generator may have generated the test code. In one embodiment, the test code to be inserted may be chosen from a plurality of available test codes. In different tests or different iterations during testing, one or more different test code may be inserted into the source code or test code may not be included for some iterations. The source code, which may include test code, may be compiled and/or packaged 404 to produce an executable application. The application may include one or more modules. The application may include one or more configurations. The application may be executable in one or more environments or platforms. For example, an application may be compiled into Intel 486 computer instructions, into instructions for other hardware systems, or to instructions executable on a plurality of systems. The application may be J2EE compliant so that it may be executed on many different platforms or environments that implement a JVM. Data may be collected indicating events or results of inserting test code or compilation and/or packaging.

Depending on the type of testing to be performed or the type of results sought, testing may determine whether to replace parts of the application to be tested, as indicated at 405. For example, the configuration of the application, its modules, or any part may be changed, as indicated at 406. The module in an application may be replaced by another module generated or altered by a test generator to enable certain tests. The configuration of a module in an application may be changed, for example replaced by a configuration that enables different transaction types or interfaces. In one embodiment, alternate modules or configurations for testing may be chosen from a plurality of available modules or configurations. The plurality of other modules or configurations may have been generated before testing or may be generated dynamically during testing either all at once or at least one for each iterations during testing. In one embodiment, one version of an application may be substituted for another. In one embodiment, a test generator may generate parts to add or modify existing modules or applications to be tested and instead of replacing modules or applications these may be altered according to the testing parameters generated by the automated test generator. In different tests or different iterations during testing, one or more configurations, application, or modules may be altered. As indicated at 405, in some tests no changes to modules, applications, or configurations may be made after compilation and/or packaging 404, for example after different test was inserted 403 before compilation and/or packaging 404. Data may be collected during modification of modules or applications indicating events or results.

The test may then be deployed, as indicated at 407. The test may be a modified version of the application to be tested and/or it may be a program to monitor the execution of the application. Deploying the test may involve deploying the application and its modules for testing. In one embodiment, the application includes test code, test modules, test configurations, or other changes from the original application to test functionality and/or operation during its execution. Deployment may involve setting up the execution environment for the application. For example, services may be configured to match the configuration of the application, memory may be allocated, or message-handling parameters may be set according to the configuration file, or other configuration parameter may be set. Data regarding results of or events during deployment may be collected during the deployment of the test.

Once deployed, the test may be executed to assess the operation and functions of the application to be tested as deployed, as indicated at 408. As part of executing the test, the application may be executed. During execution, one or more modules of the application may execute. In one embodiment, a plurality of tests and/or applications may have been deployed. The plurality of tests and/or applications may correspond to the output of a test generator. In this embodiment, during execution 408 each test or application may be executed either sequentially or in parallel. For example, after completing a test, another of the tests may be selected and executed, until all tests have been performed. In one embodiment, during execution 408 all an application is tested several times each under a different configuration. Data indicating the results of execution may be collected during execution of a test.

After completing execution, the application may be undeployed, as indicated at 409. During undeployment, memory allocated to programs and/or their data may be de-allocated and/or other housekeeping may be performed. Data indicating the results of undeployment may be collected.

Testing may involve a plurality of iterations, such that different tests are performed or the application to be tested is tested under different conditions, as indicate at 410. For example, after executing one test, another iteration may execute a test where the source code, configurations, and/or modules are different, so that different test scenarios are produced and executed. For example, during different iterations of automated testing, the same application, modules, and test may be used but configurations may be changed. After an application is undeployed, testing may automatically proceed to test another application, for example using other modules 406 created by the automatic test generator, or using another dynamically generated module, or using code with other test code generated by an automatic test generator inserted.

Testing may be ongoing, such that the process of performing the test or plurality of tests may be automated. Errors or failures may be detected and reported as part of the testing framework at any stage. During deployment, execution, and undeployment, testing may include verifying the configuration and/or operation of individual modules of the application to provide more precise identification of errors or failures, for example using code inserted into the application and/or its modules. Module or application status may be reported during testing. In one embodiment, testing may observe the input and/or output of operations or functions and determine whether failures or errors occur. For example, during testing error messages from an operating system may be received if the application is not deployed successfully, if exceptions are generated during execution of the application, if data is exchanged between modules, or other similar events occur during the life cycle of the application.

Figure 5:
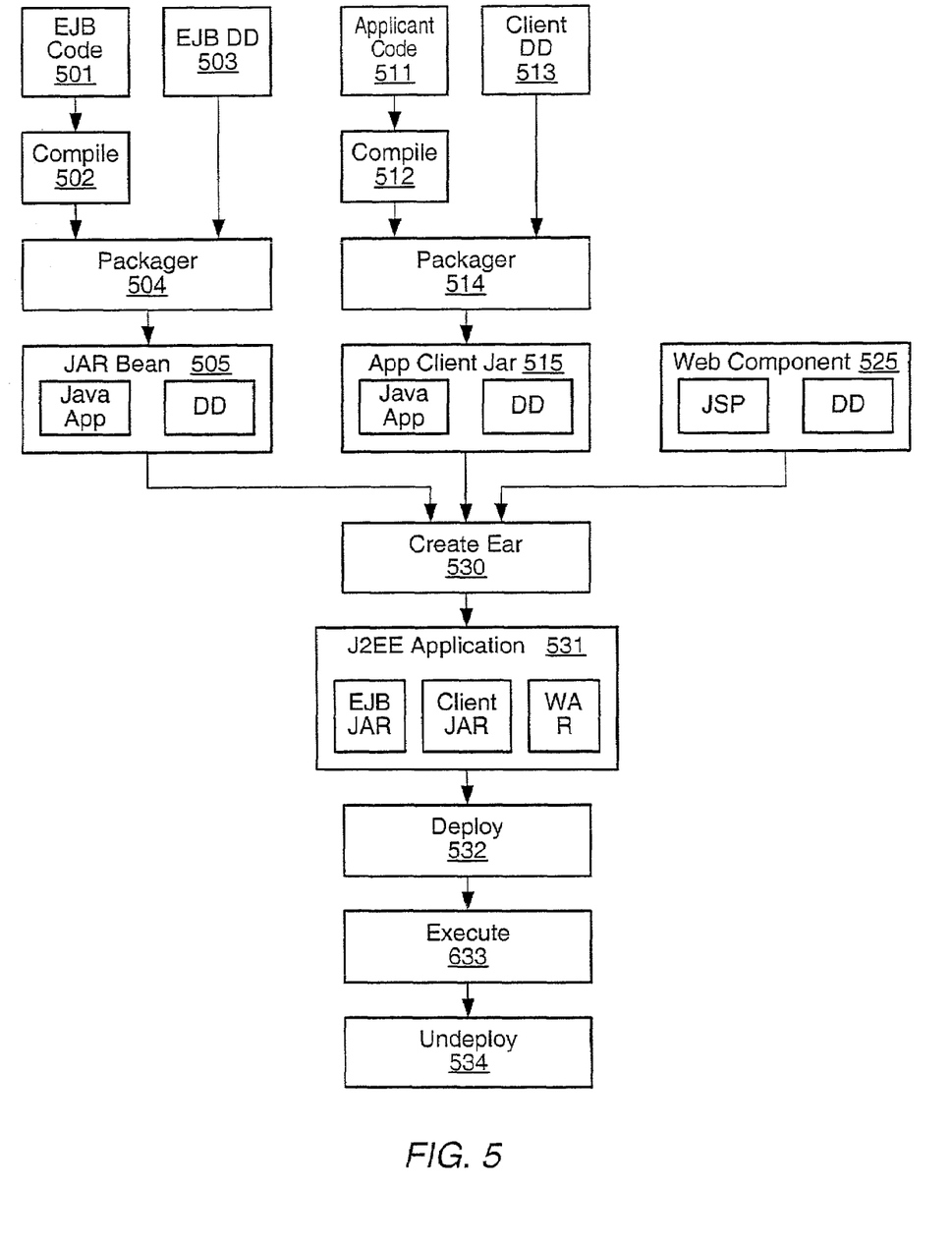
FIG. 5 illustrates testing a J2EE application including a plurality of modules during application preparation and execution according to one embodiment.

As illustrated in FIG. 5, in one J2EE embodiment tests may be generated for one or more modules 501 and 511. Testing from source code through execution and including undeployment may be a lengthy process; automation of the testing may reduce the likelihood of error and save time. Implementing automation may include using a script to invoke one or more programs to prepare one or more tests and execute them.

In one embodiment, an application as indicated at 531 may be tested from deployment, through execution, to undeployment, as indicated at 532, 533, and 534. During tests, the results may be tabulated, made visible, and/or saved. An application EAR file may be deployed on a J2EE server that functions as the application's container to provide services. Prior to execution, database tables for the application may be created and populated. After deployment on the server, the application may execute. An application may be undeployed after it terminates. Testing may be configured to automatically repeat with other tests or other applications to provide further automation. Testing may be configured to only alter parts of the application for subsequent tests, for example changing deployment descriptors or modules in an EAR file.

The EJB code 501 and its deployment descriptor 503 may be generated automatically or may be provided by a user. The files may be tests generated automatically as described above in FIG. 3. A client 511 and its deployment descriptor 513 may follow similar generation processes. Each file may be compiled and packaged as required to produce application modules, as indicated at 502, 504, 512, and 514, for execution in a container. Different modules 505, 515, and 525 may be included to create different EAR files for different tests or scenarios. In one embodiment, a plurality of EAR files for testing may be created, each including one or more modules with different variations. For example, two variants of the same EJB module may be one including a remote interface description for the EJB and another including a locate interface description.

In one embodiment, tests may include conversion of local interfaces to remote interfaces and vice versa. Interfaces define the methods of a module, such as an EJB, that are callable by a client. An interface may define methods for creating and removing the module. For an entity bean, the interface may also define a finder method to enable a client to locate the entity bean. A local interface for a module may be used by a client residing in the same server or container. A client residing in a different container or server than a module it seeks to invoke may use a remote interface for that module. In one embodiment, remote access may use Remote Method Invocation (RMI). RMI may enable an object running in one Java Virtual Machine (JVM) or container to invoke methods on an object running in a different JVM or container. RMI may also be used to access another object in the same JVM or container. In one embodiment, RMI-IIOP may be used to provide interoperability with Common Object Request Broker Architecture (CORBA) object, as RMI-IIOP is a version of RMI implemented to use the CORBA IIOP protocol.

A module may include a remote interface class and/or a local interface class. For testing modules or their applications, interface classes may be converted from one type to the other to ensure proper operation in either mode. In one embodiment, testing using a remote interface may also test the functionality of the local interface. In this embodiment, testing modules or applications may involve changing all local interfaces to remote interfaces.

In one embodiment of a test generator, the test generator may generate tests where parameters other than interface type may be varied for a single module test, so as to multiply the number of tests cases and achieve broad test area coverage. A test generator may produce multiple test cases from a single module test dynamically, which may make changing and debugging the logic of the module test easier. The multiplication of test cases may follow the specification of the environment, for example to test features of EJB specifications.

For example, the test generator may vary transaction and security attributes, such as by converting them in test cases to some other transaction or security setting in different tests. Different attributes may be specified in a configuration file, such as a deployment descriptor. In one embodiment, the tests may be configured to use at least a plurality of different transactions. In one embodiment, the tests may be configured to use at least a plurality of different security attributes. Some or all possible allowed transaction or security attributes may be tested using the tests created by the automatic test generator.

A transaction may be associated with some unit of work of a module that may modify or access data, such as a method of an object. Transaction may provide a framework or scope for the work to occur, and may indicate whether to complete a modification or to undo the modification. Transactions may be managed by a container of the module. One or more attributes may characterize transactions, for example transaction attributes may be set to "required," "never," "notsupported," "requiresnew," "mandatory," "supports," or other data indicating how to handle transactions. The "required" attribute may indicate that a transaction may be provided for the corresponding unit of work. The "mandatory" attribute may cause an exception to be generated when the associated unit of work is invoked outside a transaction. A server or container of the module may control the transaction scope based on the transaction attributes when that module's methods are invoked. For example, services and management function, synchronization, and other functions may be provided by a container to a module depending on the requested transaction and the configuration settings. Concurrent access to the same data may be possible using transactions. A transaction isolation level may be used to indicate whether data being modified in a transaction is accessible by other concurrent transactions. The transaction isolation level also may be varied in different configurations to test different concurrent accesses.

Security attributes may provide authentication for modules, as well as access privileges or authorization. A container may provide security related services to modules depending on the security attributed defined by configuration settings, such as those in deployment descriptors. In one embodiment, a test generator may generate tests covering one or more security setting. The set of tests generated may test all security attributes according to a specification. In one embodiment, tests to check security and transaction related functions of modules or applications both may be inserted in modules or applications to test their security configuration and/or other security settings.

In one embodiment of a test generator, the test generator may generate tests where the type and range of data may be changed, for example to cover all positive and negative values of a data type. Data types may be Boolean, numbers, bytes, shorts, integers, longs, floats, doubles, strings, other computational data type or combination of other types. The automatic test generator may create tests that use different values for data types used by modules or applications. In one embodiment, the test generator may generate the possible values for a data type once and store them for access during one or more tests. During testing, the values may be used by the automatic test generator to determine the response and operation of the application. Some tests may be negative tests to check error handling as described above.

In one embodiment of a test generator, the test generator may generate tests where the primary key data types may be converted or ported to other allowed data types or combination of data types. A primary key may uniquely identify a particular instance of a module within its environment. For example, a Bean may have a primary key that uniquely identifies it within its container. In one embodiment, at least Entity Beans include primary keys. Allowed data types may be any RMI data types or combinations of data types in the primary key class. For example, a primary key may be a class comprising different data types, such a class that includes an integer and string. In one embodiment, a data file may contain at least some of the RMI-IIOP data types, java data types, SQL data types, initial values and JDBC set statement, and/or other appropriate data types that may be required for creating Bean programs, primary key java programs, deployment descriptor files for the beans, or other modules used for testing. In a Bean, one or more methods may be generated for one or more data types, for example methods for Bean creation, Bean removal, finding modules by primary key, and/or other methods dependent on primary key data types. In different tests produced by the test generator, RMI calls may be made using data types different from the primary key data type. Primary key tests may be performed to test Bean Managed Persistence and Container Managed Persistence. Some calls may be negative tests and may be handled as described above.

The automatic test generator may include other features to produce enhanced testing that may provide better tests of applications. For example, a test generator may include functionality enabling the value of read only beans to be refreshed, to take into account cache properties, reflect commit options, or similar functions. The test generator may invoke such functions to specify variations in configurations (for example in deployment descriptor for application server specific xml files such as ias-ejb-jar.xml). The configurations created by an automatic test generator may store possible values of properties that may be read during testing. The automatic test generator may incorporated such values into the application to be tested, for example by adding them to the deployment descriptor of an EJB JAR file during its deployment. Similarly, a range of possible values for cache properties may be stored. These values may be packaged into an EJB JAR file during deployment for testing as described above. A script (e.g. in perl) may be used to generate cache property files (e.g. ias-xml) to store the different options. To enable refreshing of read only beans programmatically, a test generator may produce such functions for inclusion in one or more modules for testing. In one embodiment, for example, a ReadOnlyBeanNotifier function may enable a module to notify a read only bean so that the value of the read only bean may be updated. The container may implement the ReadOnlyBeanNotifier. Containers may provide such enhanced features by extending the standard RMI interface. In one embodiment, a test including a read only bean may include this feature to provide testing of that bean. An automatic test generator may be configured to provide other features for incorporation into modules or applications to make testing of certain properties or further testing possible. The automatic test generator may insert such functionality into the modules or applications for testing.

In one embodiment of a test generator, the test generator may generate tests in blocks. For example, an application may include one or more modules and the test blocks may each correspond to one or more modules. An application's modules may execute from client to session bean to bean managed persistence to container managed persistence and to message driven bean. However, the modules may execute in varying order or may loop back. By producing test blocks corresponding to execution blocks whose combination may change, writing one model test with one or more test blocks may be sufficient to test many combinations as appropriate. Some combinations may not be allowed. As negative tests, checks for proper exceptions from application server or modules may be implemented for these combinations.

In one embodiment, tests for combination of a parameter or combination of parameters for a module test may be generated. For example, tests may be generated for all primary keys, Bean to Bean communication settings, transaction security features, or other features. Combinations of tests may be produced. For example, primary key scenarios may be generated, communication tests may be generated, and tests combining the primary key and communication tests may then be produced that tests primary key scenarios with Bean to Bean communication. In one embodiment, all primary key scenarios are generated by default and/or independent of any parameters. While significant computing time may involve script execution, a wide spectrum of coverage may be obtained.

Figure 6:
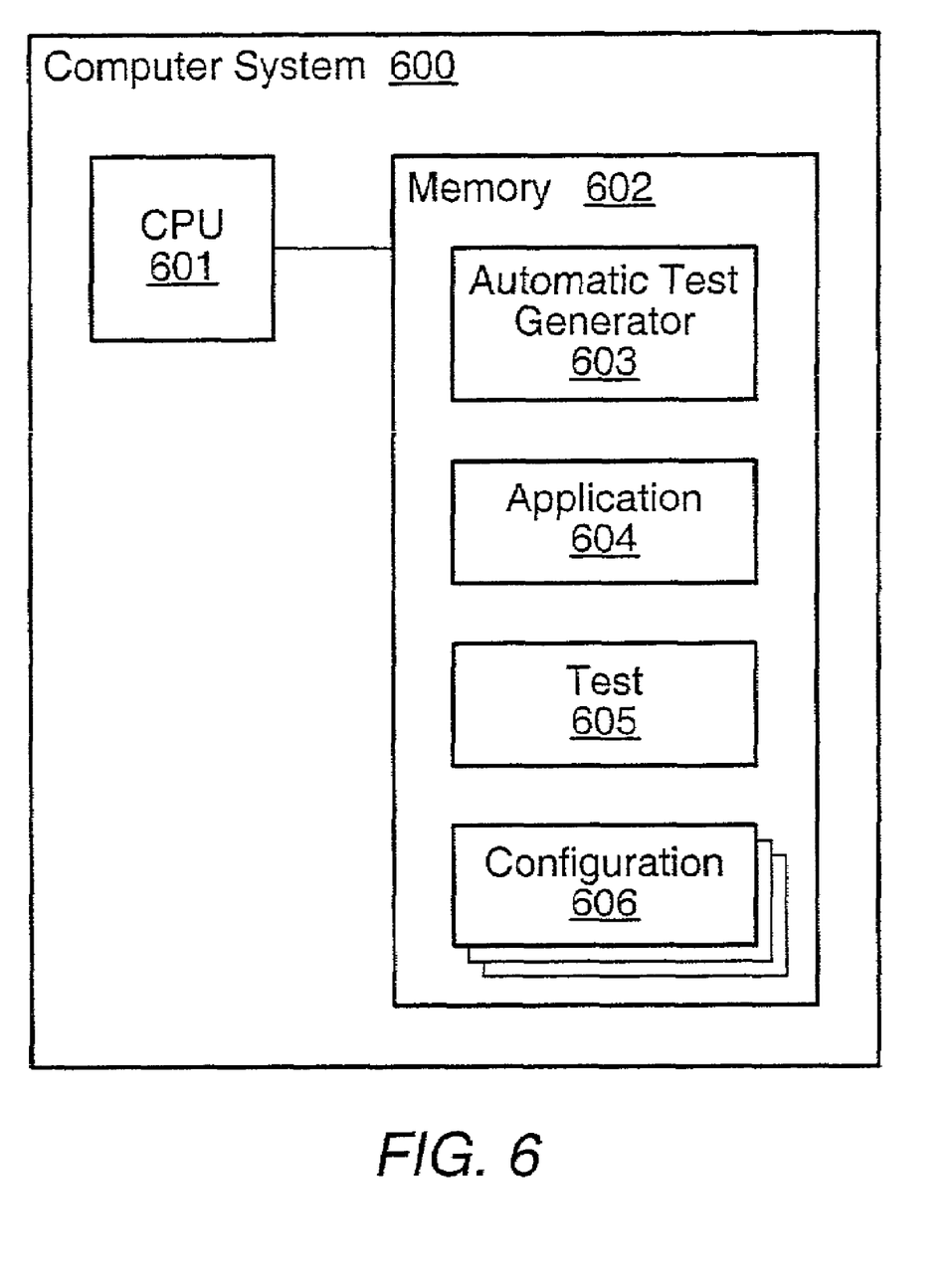
FIG. 6 illustrates testing a computer system including a CPU and memory implementing one embodiment of an automatic test generator.

FIGS. 6 illustrates testing a computer system 600 including a CPU 601 and memory 601 implementing one embodiment of an automatic test generator. The CPU 601 and memory 602 may be coupled. The memory may store code executable by the CPU to implement one embodiment of an automatic test generator 603. The memory 602 may also contain the application to be tested, configuration data, or other data that may be used or produced by the automatic test generator 603.

In one embodiment, to speed up the generation of tests the workload may be distributed among different computing devices in a computer system to exploit possible parallelism. A computer system may be distributed over a network. For example, test generators may execute on different computing devices to generate one or more different tests. Each test generator may be configured, for example through execution parameters or depending on input files, to limit duplication of work. In one embodiment, a generator on one computing device may generate tests for communication features and a generator on another computing device may generate tests for data types. The results may be gathered after generation or combined to form new tests. A similar approach may be used for executing the tests. Independently of whether the tests were generated on a plurality of computing devices, tests may be distributed among a similar or different plurality of computing devices. Duplicates of other programs, modules, files, or data may also be distributed to one or more computing devices or appropriate computing devices may share access to some corresponding storage device. Testing may occur concurrently on a plurality of computing devices in the system. Test results may be gather and/or combined. Various parallel computing methods may be used to organize computation, communication, and manage resources. For example, load balancing may be provided. In one embodiment, a dedicated computing device is configured to coordinate the distributed testing.

An automatic test generator may implement other automatic tests to limit the burden on developers of testing applications. For example, the automatic test generator may be configured to automatically rename or number files. The framework developed for the system and method of automatic testing may be combined with other tools or systems to provide further testing.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

It will be appreciated by those of ordinary skill having the benefit of this disclosure that the illustrative embodiments described above are capable of numerous variations without departing from the scope and spirit of the invention. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method, comprising:
    a test generator generating at least a portion of an application from source code;
    the test generator generating a test for the application;
    the test generator generating one or more clients configured to interact with the application;
    the test generator generating a plurality of different configurations for executing the test; and
    for each of the plurality of different configurations, the test generator deploying the test and executing the test according to that configuration;

wherein said executing produces test results for each of the plurality of different configurations.

2. The method as recited in claim 1, further comprising the test generator generating one or more modules from source code configured to provide functionality for the application.

3. The method as recited in claim 1, wherein said executing the test includes executing the application, wherein the application includes one or more modules and one or more clients, and wherein at least one of the one or more modules and at least one of the one or more clients are configured to execute during said executing the application.

4. The method as recited in claim 3, wherein the test includes a plurality of test blocks each corresponding to one of the one or more modules.

5. The method as recited in claim 3, further comprising the test generator inserting test code within one of the one or more modules.

6. The method as recited in claim 3, further comprising the test generator inserting at least parts of the test within the application.

7. The method as recited in claim 3, further comprising a first of one or more clients configured to execute in a local environment invoking a function of a first of the one or more modules in the local environment using an interface of the first module during said executing the application.

8. The method as recited in claim 7, further comprising the first client executing in a different environment, wherein the first client is reconfigured to invoke the function of the first module remotely and the interface is configured to enable remote invocation of the function.

9. The method as recited in claim 3, wherein the test includes changing one or more primary key data types corresponding to the one or more modules to another data type.

10. The method as recited in claim 1, wherein the test includes a plurality of transaction tests for testing allowed transaction attributes of the application according to each of the plurality of different configurations.

11. The method as recited in claim 10, further comprising the test generator inserting one or more of the plurality of transaction tests in the application.

12. The method as recited in claim 1, wherein the test includes a plurality of security tests for testing allowed security attributes of the application according to each of the plurality of different configurations.

13. The method as recited in claim 12, further comprising the test generator inserting one or more of the plurality of security tests in the application.

14. The method as recited in claim 1, further comprising the test generator undeploying the test after said executing the test, wherein said undeploying produces other test results for each of the plurality of configurations.

15. A method, comprising:
a test generator generating a test including a plurality of test blocks for an application including a plurality of modules, wherein for each of the plurality of modules there is at least one corresponding test block, wherein the test includes changing one or more primary key data types corresponding to the one or more of the plurality of modules to another data type;
the test generator generating a configuration for executing the test; and
the test generator executing the test a plurality of times according to the configuration, wherein said executing includes deploying and executing the plurality of test blocks, and wherein the plurality of test blocks are executed in a different order during a first of the plurality of times and a second of the plurality of times;
wherein said executing produces test results for each of the plurality of times.

16. The method of claim 15, further comprising:
the test generator deploying the test before said executing the test; and
the test generator undeploying the test after said executing the test;
wherein said deploying and said executing produce test results.

17. The method of claim 16, wherein said deploying and said undeploying occur for each of the plurality of times.

18. The method as recited in claim 15, further comprising the test generator generating at least part of the application.

19. The method as recited in claim 15, further comprising:
the test generator generating a plurality of configurations for executing the test; and
for each of the plurality of configurations the test generator executing the test a plurality of times according to that configuration.

20. The method as recited in claim 15, further comprising:
the test generator generating a plurality of different tests each including a plurality of test blocks for the application including a plurality of modules; and
for each of the plurality of different tests the test generator executing that test a plurality of times according to the configuration.

21. The method as recited in claim 15, wherein the test includes a plurality of transaction tests for testing allowed transaction attributes of the application according to the configuration.

22. The method as recited in claim 15, wherein the test includes a plurality of security tests for testing allowed security attributes of the application according to the configuration.

23. A computer system, comprising:
a processor; and
memory coupled to the processor, wherein the memory stores program instructions executable by the processor to implement a test generator configured to:
generate at least a portion of an application from source code;
generate a test for the application;
generate one or more clients configured to interact with the application;
generate a plurality of different configurations for executing the test; and
for each of the plurality of different configurations, deploy the test and execute the test according to that configuration; wherein said executing produces test results of said deployment and said execution for each of the plurality of different configurations.

24. The computer system as recited in claim 23, further comprising instructions executable by the processor to generate one or more modules from source code configured to provide functionality for the application.

25. The computer system as recited in claim 23, wherein said instructions executable by the processor to execute the test includes instructions executable by the processor to execute the application, wherein the application includes one or more modules and one or more clients, and wherein at least one of the one or more modules and at least one of the one or more clients are configured to execute during said executing the application.

26. The computer system as recited in claim 25, wherein the test includes a plurality of test blocks each corresponding to one of the one or more modules.

27. The computer system as recited in claim 25, further comprising instructions executable by the processor to insert test code within one of the one or more modules.

28. The computer system as recited in claim 25, further comprising instructions executable by the processor to insert at least parts of the test within the application.

29. The computer system as recited in claim 25, further comprising a first of the one or more clients configured to invoke a function of a first of the one or more modules in the local environment using an interface of the first module during said executing the application.

30. The computer system as recited in claim 29, further comprising the first client configured to execute in a different environment, wherein the first client is reconfigured to invoke the function of the first module remotely and the interface is configured to enable remote invocation of the function.

31. The computer system as recited in claim 25, wherein the test includes a plurality of security tests for testing allowed security attributes of the application according to each of the plurality of different configurations.

32. The computer system as recited in claim 31, further comprising instructions executable by the processor to insert one or more of the plurality of security tests in the application.

33. The computer system as recited in claim 25, wherein the test includes changing one or more primary key data types corresponding to the one or more modules to another data type.

34. The computer system as recited in claim 23, wherein the test includes a plurality of transaction tests for testing allowed transaction attributes of the application according to each of the plurality of different configurations.

35. The computer system as recited in claim 34, further comprising instructions executable by the processor to insert one or more of the plurality of transaction tests in the application.

36. The computer system as recited in claim 23, further comprising instructions executable by the processor to undeploy the test after said executing the test, wherein said undeploy produces other test results of said undeploy.

37. A computer system, comprising:
a processor; and
memory coupled to the processor, wherein the memory stores instructions executable by the processor to implement a test generator configured to:
generate a test including a plurality of test blocks for an application including a plurality of modules, wherein for each of the plurality of modules there is at least one corresponding test block; wherein the test includes changing one or more primary key data types corresponding to one or more of the plurality of modules to another data type;
generate a configuration for executing the test; and
execute the test a plurality of times according to the configuration, wherein said executing includes executing the plurality of test blocks, and wherein the plurality of test blocs are executed in a different order during a first of the plurality of times and a second of the plurality of times;
wherein said executing the test produces test results of said executing.

38. The computer system of claim 37, further comprising instructions executable by the processor to:
deploy the test before said executing the test; and
undeploy the test after said executing the test;
wherein said deploy and undeploy produce test results of said deploy and said undeploy.

39. The computer system of claim 38, wherein said deploy and said undeploy occur for each of the plurality of times.

40. The computer system as recited in claim 37, further comprising instructions executable by the processor to automatically generate at least part of the application.

41. The computer system as recited in claim 37, further comprising instructions executable by the processor to:
generate a plurality of configurations for executing the test; and
for each of the plurality of configurations execute the test a plurality of times according to that configuration.

42. The computer system as recited in claim 37, further comprising instructions executable by the processor to:
generate a plurality of different tests each including a plurality of test blocks for the application including a plurality of modules; and
for each of the plurality of different tests execute that test a plurality of times according to the configuration.

43. The computer system as recited in claim 37, wherein the test includes a plurality of transaction tests for testing allowed transaction attributes of the application according to each of the plurality of configurations.

44. The computer system as recited in claim 37, wherein the test includes a plurality of security tests for testing allowed security attributes of the application according to the configuration.

45. A tangible computer-readable storage medium having program instructions stored thereon for automatically testing software, wherein the program instructions are executable to implement:
a test generator generating a test for an application;
the test generator generating one or more clients configured to interact with the application;
the test generator generating a plurality of different configurations for executing the test; and
for each of the plurality of different configurations, the test generator deploying the test and executing the test according to that configuration;
wherein said executing produces test results for each of the plurality of different configurations;
wherein said executing the test includes executing the application, wherein the application includes one or more modules and one or more clients, and wherein at least one of the one or more modules and at least one of the one or more clients are configured to execute during said executing the application.

46. The tangible computer-readable storage medium as recited in claim 45, further comprising the test generator generating one or more modules from source code configured to provide functionality for the application.

47. The tangible computer-readable storage medium as recited in claim 45, wherein the program instructions are executable to implement the test generator generating at least a portion of the application from source code.

48. The tangible computer-readable storage medium as recited in claim 45, wherein the test includes a plurality of test blocks each corresponding to one of the one or more modules.

49. The tangible computer-readable storage medium as recited in claim 45, further comprising the test generator inserting test code within one of the one or more modules.

50. The tangible computer-readable storage medium as recited in claim 45, further comprising the test generator inserting at least parts of the test within the application.

51. The tangible computer-readable storage medium as recited in claim 45, further comprising a first of the one or more clients configured to execute in a local environment invoking a carrier medium of a first of the one or more modules in the local environment using an interface of the first module during said executing the application.

52. The tangible computer-readable storage medium as recited in claim 51, further comprising the first client executing in a different environment, wherein the first client is reconfigured to invoke the function of the first module remotely and the interface is configured to enable remote invocation of the function.

53. The tangible computer-readable storage medium as recited in claim 45, wherein the test includes changing one or more primary key data types corresponding to the one or more modules to another data type.

54. The tangible computer-readable storage medium as recited in claim 45, wherein the test includes a plurality of transaction tests for testing allowed transaction attributes of the application according to each of the plurality of configurations.

55. The tangible computer-readable storage medium as recited in claim 54, further comprising the test generator inserting one or more of the plurality of transaction tests in the application.

56. The tangible computer-readable storage medium as recited in claim 45, wherein the test includes a plurality of security tests for testing allowed security attributes of the application according to each of the plurality of different configurations.

57. The tangible computer-readable storage medium as recited in claim 56, further comprising the test generator inserting one or more of the plurality of security tests in the application.

58. The tangible computer-readable storage medium as recited in claim 45, further comprising the test generator undeploying the test after said executing the test, wherein said undeploying produces other test results for each of the plurality of different configurations.

59. A tangible computer-readable storage medium, having program instructions stored thereon for automatically testing software, wherein the program instructions are executable to implement:

a test generator generating a test including a plurality of test blocks for an application including a plurality of modules, wherein for each of the plurality of modules there is at least one corresponding test block, wherein the test includes changing one or more primary key data types corresponding to the one or more of the plurality of modules to another data type;

the test generator generating a configuration for executing the test;

the test generator executing the test a plurality of times according to the configuration, wherein said executing includes executing the plurality of test blocks, and wherein the plurality of test blocs are executed in a different order during a first of the plurality of times and a second of the plurality of times;

wherein said executing indicates test results of said executing.

60. The tangible computer-readable storage medium of claim 59, further comprising:

the test generator deploying the test before said executing the test; and the test generator undeploying the test after said executing the test;

wherein said deploying and said undeploying indicate test results of said deploying and said undeploying.

61. The tangible computer-readable storage medium of claim 60, wherein said deploying and said undeploying occur for each of the plurality of times.

62. The tangible computer-readable storage medium as recited in claim 59, further comprising the test generator generating at least part of the application.

63. The tangible computer-readable storage medium as recited in claim 59, further comprising:

the test generator generating a plurality of configurations for executing the test; and for each of the plurality of configurations the test generator executing the test a plurality of times according to that configuration.

64. The tangible computer-readable storage medium as recited in claim 59, further comprising:

the test generator generating a plurality of different tests each including a plurality of test blocks for the application including a plurality of modules; and for each of the plurality of different tests the test generator executing that test a plurality of times according to the configuration.

65. The tangible computer-readable storage medium as recited in claim 59, wherein the test includes a plurality of transaction tests for testing allowed transaction attributes of the application according to each of the plurality of configurations.

66. The tangible computer-readable storage medium as recited in claim 59, wherein the test includes a plurality of security tests for testing allowed security attributes of the application according to the configuration.

* * * * *